United States Patent
Nishisaka et al.

(10) Patent No.: US 8,259,433 B2
(45) Date of Patent: Sep. 4, 2012

(54) CERAMIC ELECTRONIC COMPONENT

(75) Inventors: Yasuhiro Nishisaka, Echizen (JP); Yukio Sanada, Fukui (JP); Koji Sato, Echizen (JP); Kosuke Onishi, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 344 days.

(21) Appl. No.: 12/617,834

(22) Filed: Nov. 13, 2009

(65) Prior Publication Data

US 2010/0123994 A1 May 20, 2010

(30) Foreign Application Priority Data

Nov. 14, 2008 (JP) .................................. 2008-291724
Oct. 28, 2009 (JP) .................................. 2009-247432

(51) Int. Cl.
*H01G 4/228* (2006.01)
*H01G 4/06* (2006.01)

(52) U.S. Cl. .................. 361/306.3; 361/309; 361/321.2; 361/321.3

(58) Field of Classification Search ............... 361/306.1, 361/306.2, 306.3, 308.1, 309, 321.2, 321.3
See application file for complete search history.

(56) References Cited

U.S. PATENT DOCUMENTS

| | | | |
|---|---|---|---|
| 5,075,665 A | 12/1991 | Taira et al. | |
| 7,318,868 B2 * | 1/2008 | Yokoyama et al. | 118/110 |
| 2006/0126264 A1 | 6/2006 | Yoshii et al. | |
| 2007/0117338 A1 * | 5/2007 | Yamamoto et al. | 438/396 |
| 2008/0239617 A1 * | 10/2008 | Motoki et al. | 361/301.4 |

FOREIGN PATENT DOCUMENTS

| | | |
|---|---|---|
| DE | 39 30 000 A1 | 3/1990 |
| EP | 1 895 590 A1 | 3/2008 |
| JP | 09-260204 A | 10/1997 |
| JP | 2001-126950 A | 5/2001 |
| JP | 2003-309373 A | 10/2003 |
| JP | 2006-173270 A | 6/2006 |

OTHER PUBLICATIONS

Official Communication issued in corresponding European Patent Application No. 09013970.0, mailed on Aug. 17, 2010.

* cited by examiner

*Primary Examiner* — Eric Thomas
*Assistant Examiner* — Arun Ramaswamy
(74) *Attorney, Agent, or Firm* — Keating & Bennett, LLP

(57) ABSTRACT

In a ceramic electronic component having a thin structure, the occurrence of cracks due to stress applied when the ceramic component is being mounted or in a mounted state are prevented. Each of first and second external terminal electrodes has a substantially rectangular region on a principal surface of a ceramic element body, the principal surface being directed to the mounting surface side. An end of the first external terminal electrode, which is arranged in contact with a gap region, and an end of the second external terminal electrode, which is positioned in contact with the gap region, each preferably have a concave-convex shape on the principal surface.

24 Claims, 18 Drawing Sheets

CERAMIC ELECTRONIC COMPONENT

BACKGROUND OF THE INVENTION

1. Field of the Invention

The present invention relates to a ceramic electronic component, and more particularly, to a structure of an external terminal electrode, which is provided in a ceramic electronic component.

2. Description of the Related Art

Recently, with a reduction in size and thickness of electronic devices such as cell phones and portable music players, the size and the thickness of a ceramic electronic component disposed in those electronic devices have also been reduced at a high pitch. While the ceramic electronic component is usually mounted on a wiring board disposed inside the electronic device, the strength of the ceramic electronic component itself tends to lower because of the reduction in size and thickness of the ceramic electronic component. This leads to a risk that the ceramic electronic component may crack when being mounted or during use. Such a point will be described in more detail below.

FIG. 16 is a plan view of a multilayer ceramic capacitor 1 as one example of known ceramic electronic components, and FIG. 17 is a sectional view of the multilayer ceramic capacitor 1 illustrated in FIG. 16. These drawings illustrate the problems which are caused due to stress applied when the multilayer ceramic capacitor 1 is being mounted or is in a mounted state.

A ceramic element body 2 included in the multilayer ceramic capacitor 1 has a first principal surface 3 and a second first principal surface 4 arranged to face each other. FIG. 16 illustrates the second principal surface 4 arranged to direct the mounting surface side where the multilayer ceramic capacitor 1 is mounted to a wiring board. As illustrated in FIG. 16, respective ends of first and second external terminal electrodes 5 and 6, which are located on the second principal surface 4 to face each other, are arranged to extend linearly.

For example, when the multilayer ceramic capacitor 1 is mounted to a wiring board (not shown), the multilayer ceramic capacitor 1 is sucked at the first principal surface 3 by a suction head (not shown) of a mounting machine and is mounted to lands on the wiring board. As illustrated in FIG. 17, however, stress is applied to the first principal surface 3 due to inertia during the mounting operation, whereby a point 7 of application of force is formed. Further, contact points of the first and second external terminal electrodes 5 and 6, which are formed at opposite ends of the multilayer ceramic capacitor 1, with the wiring board become fulcrums 8 and 9, respectively. As a result, the ends (denoted by dotted-line circles) of portions of the first and second external terminal electrodes 5 and 6, which are extended over the second principal surface 4 on the mounting surface side, become points 10 and 11 of action, respectively. Cracks tend to occur inside the ceramic element body 2, starting from the points 10 and 11 of action.

It should be noted that the stress providing the point 7 of application of force is not limited to the above-described stress applied when the multilayer ceramic capacitor 1 is mounted, and it includes stress generated, for example, upon flexing of the wiring board during use.

Such a phenomenon, i.e., cracking, is apt to occur when the principal surfaces 3 and 4 of the ceramic element body 2 are parallel to the mounting surface of the wiring board. In particular, cracking is more apt to occur as the dimension of the multilayer ceramic capacitor 1 in the direction of height thereof is reduced.

To solve the above-described problem, Japanese Unexamined Patent Application Publication No. 2001-126950, for example, proposes an arrangement to distribute stress, as illustrated in FIG. 18, by forming triangular external terminal electrodes 17 and 18 on a principal surface 16 of a ceramic element body 15 included in a ceramic electronic component 14, the principal surface 16 being positioned to direct the mounting surface side.

However, the electrode shape described in Japanese Unexamined Patent Application Publication No. 2001-126950 has the following problems.

Because areas of the external terminal electrodes 17 and 18 on the principal surface 16 arranged to direct the mounting surface side are reduced, fixation forces for holding the external terminal electrodes 17 and 18 fixed to the ceramic element body 15 are reduced in proportion.

Because areas of the external terminal electrodes 17 and 18 on the principal surface 16 positioned to direct the mounting surface side are reduced, contact areas of the external terminal electrodes 17 and 18 with a bonding material, such as a solder, are reduced in proportion. Accordingly, reliability in connection of the ceramic electronic component 14 with respect to the wiring board deteriorates.

As described in Japanese Unexamined Patent Application Publication No. 2003-309373, for example, it has recently been proposed to mount an electronic component in a state embedded in a wiring board. When such a technique is used, a via hole is formed by irradiating a laser beam to each of the external terminal electrodes of the electronic component from the wiring board side, and a conductor is filled into the interior of the via hole for connection to a circuit on the wiring board. In that case, if the areas of the external terminal electrodes 17 and 18 on the principal surface 16 arranged to direct the mounting surface side are relatively small as in the ceramic electronic component 14 illustrated in FIG. 18, a difficulty arises in accurately irradiating the laser beam so as to reach the external terminal electrodes 17 and 18.

SUMMARY OF THE INVENTION

Preferred embodiments of the present invention provide a structure of an external terminal electrode in a ceramic electronic component, which can solve the problems described above.

According to a preferred embodiment of the present invention, a ceramic electronic component includes a ceramic element body having a first principal surface and a second principal surface arranged to face each other, a first lateral surface and a second lateral surface arranged to face each other, and a first end surface and a second end surface arranged to face each other, the second principal surface being directed to the mounting surface side, a first external terminal electrode disposed at least on the second principal surface of the ceramic element body, and a second external terminal electrode disposed at least on the second principal surface of the ceramic element body in a spaced relation to the first external terminal electrode with a predetermined gap region disposed therebetween. In order to solve the technical problems in the art, the ceramic electronic component is preferably constructed as follows.

Each of the first external terminal electrode and the second external terminal electrode preferably has a substantially rectangular region on the second principal surface, and an end of the first external terminal electrode, which is in contact with the gap region, and an end of the second external terminal electrode, which is positioned in contact with the gap region, each have a concave-convex shape on the second principal surface.

In a preferred embodiment, a structure similar to that described above is disposed on the first principal surface as well. More specifically, the first external terminal electrode further has a substantially rectangular region on the first principal surface, the second external terminal electrode further has a substantially rectangular region on the first principal surface in a spaced relation to the first external terminal electrode with a predetermined gap region disposed therebetween, and an end of the first external terminal electrode, which is arranged in contact with the gap region, and an end of the second external terminal electrode, which is in contact with the gap region, each have a concave-convex shape on the first principal surface.

The first external terminal electrode may be arranged to extend over the first end surface, and the second external terminal electrode may be arranged to extend over the second end surface.

The ceramic electronic component according to a preferred embodiment of the present invention may further include first and second internal electrodes disposed inside the ceramic element body. In that case, the first internal electrode is electrically connected to the first external terminal electrode, and the second internal electrode is electrically connected to the second external terminal electrode.

In the above-described preferred embodiment, the ceramic element body may have a multilayered structure including a plurality of ceramic layers stacked one above another, and the first internal electrode and the second internal electrode may be arranged to face each other with particular ones of the ceramic layers interposed therebetween. With such a structure, a multilayer ceramic electronic component can be obtained.

When the first external terminal electrode is arranged to extend over the first end surface and the second external terminal electrode is arranged to extend over the second end surface as described above, it is preferable that the first internal electrode is electrically connected to the first external terminal electrode on the first end surface, and the second internal electrode is electrically connected to the second external terminal electrode on the second end surface.

Preferably, the ceramic electronic component further includes, in addition to the first and second internal electrodes, first and second via-hole conductors which are provided in the ceramic element body. The first via-hole conductor extends up to at least the second principal surface for electrical connection between the first internal electrode and the first external terminal electrode, and the second via-hole conductor extends up to at least the second principal surface for electrical connection between the second internal electrode and the second external terminal electrode. In that case, the first external terminal electrode and the second external terminal electrode are preferably arranged not to extend over any of the first lateral surface, the second lateral surface, the first end surface, and the second end surface.

Various preferred embodiments of the present invention are particularly advantageously applied to the case where the ceramic element body satisfies a relationship of W>T, assuming that a dimension of the ceramic element body measured in a direction interconnecting the first lateral surface and the second lateral surface is W and a dimension of the ceramic element body measured in a direction interconnecting the first principal surface and the second principal surface is T.

The concave-convex shape may be an irregular rugged shape, or a substantially triangular shape, or a substantially sinusoidal shape.

Various preferred embodiments of the present invention are particularly advantageously applied to the case where a relationship of about $(1/50)W \leq D1 \leq$ about $(1/10)W$ is satisfied, assuming that an array pitch of plural convex portions in the concave-convex shape is D1, and a dimension of the ceramic element body measured in a direction interconnecting the first lateral surface and the second lateral surface is W.

Preferably, the first and second external terminal electrodes are each arranged to be buried in the ceramic element body at least partially in a direction of thickness thereof.

According to various preferred embodiments of the present invention, since the end of the external terminal electrode has the concave-convex shape on the second principal surface of the ceramic element body, which is directed to the mounting surface side, stress applied to the end of the external terminal electrode is effectively distributed. As a result, the occurrence of a crack can be prevented.

Also, since the external terminal electrode has the substantially rectangular region on the second principal surface directed to the mounting surface side, a contact area of the external terminal electrode with each of the ceramic element body and a wiring board can be increased. Further, when the ceramic electronic component is embedded in the wiring board, it is possible to increase an illumination area of a laser beam. As a result, a fixation force imposed on the external terminal electrode can be increased and reliability in connection to the wiring board can be improved. In addition, a via hole can be more easily formed by irradiating the laser beam such that the via hole is arranged to extend up to the external terminal electrode with higher accuracy.

When the structural feature of the external terminal electrode, which is provided on the second principal surface of the ceramic element body, is provided on the first principal surface as well, there is no structural directivity between the first principal surface and the second principal surface when the ceramic electronic component is mounted. Thus, a mounting step can be performed with higher efficiency.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
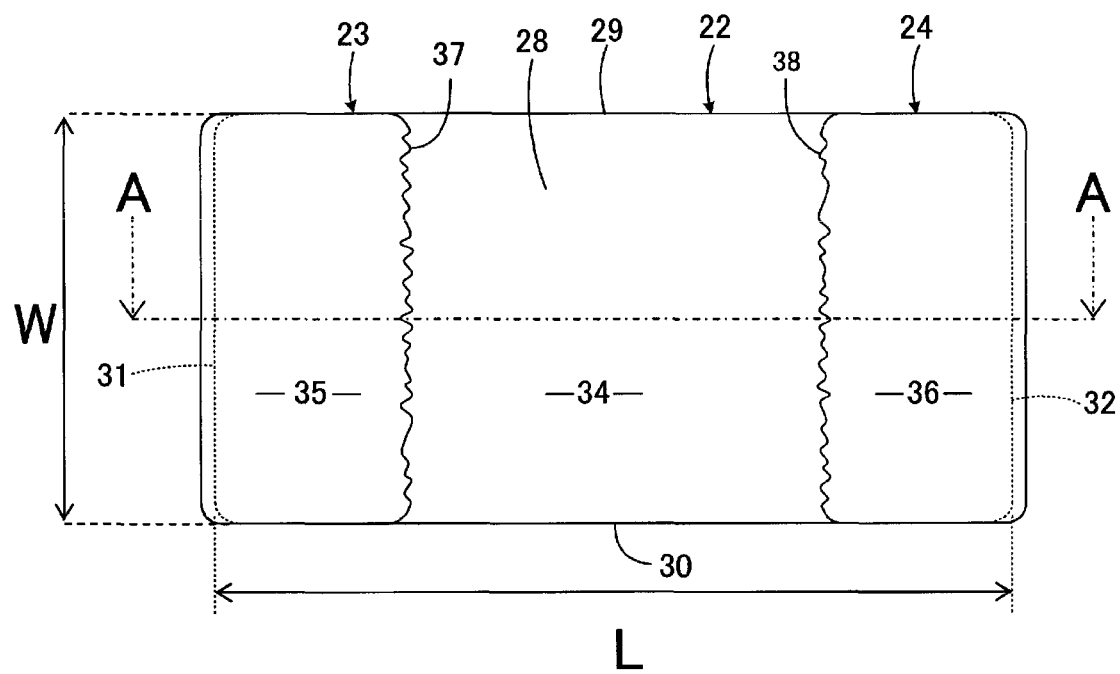
FIG. 1 is a bottom view of a multilayer ceramic capacitor according to a first preferred embodiment of the present invention, the view looking at the side including a second principal surface.
Figure 2:
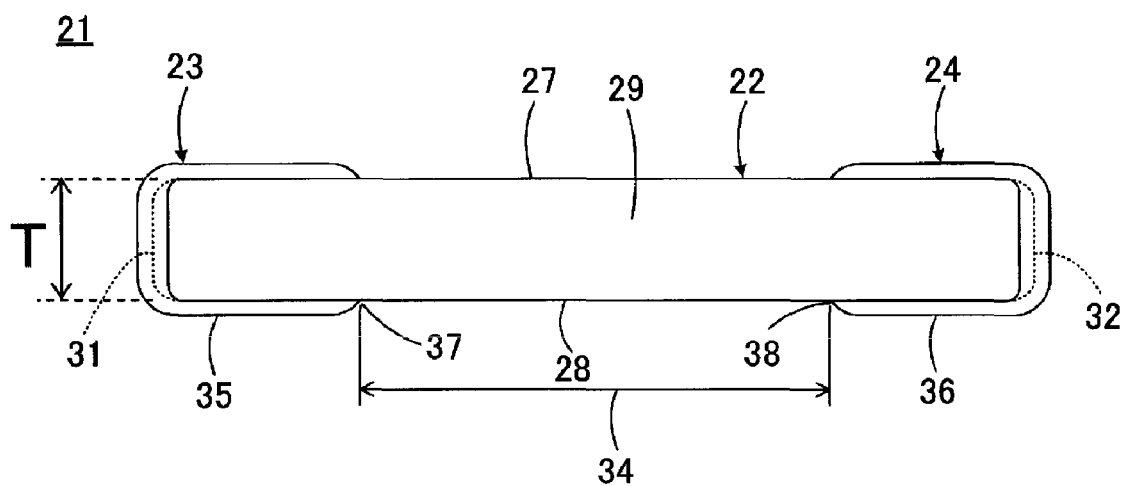
FIG. 2 is a side view of the multilayer ceramic capacitor illustrated in FIG. 1, the view looking at the side including a first lateral surface.
Figure 3:
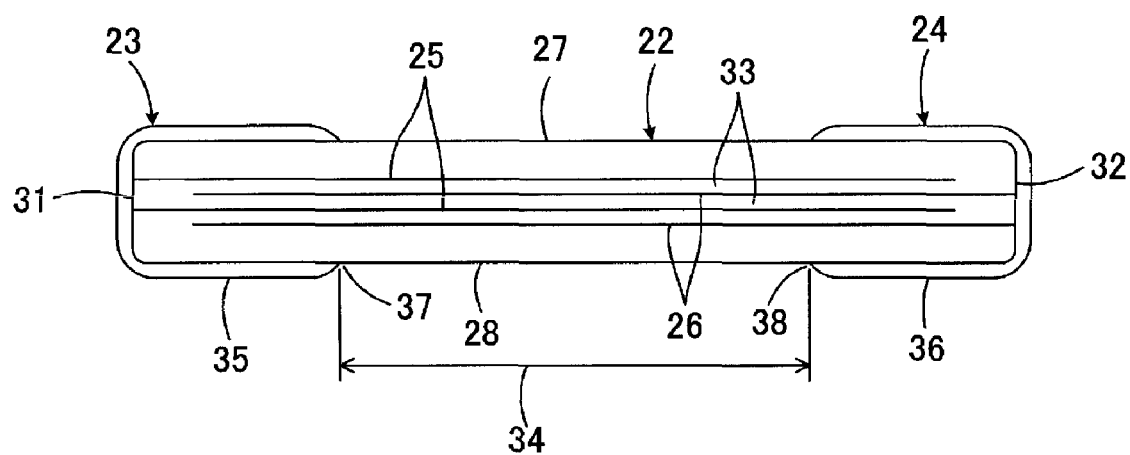
FIG. 3 is a sectional view taken along a line III-III in FIG. 1.
Figure 4:
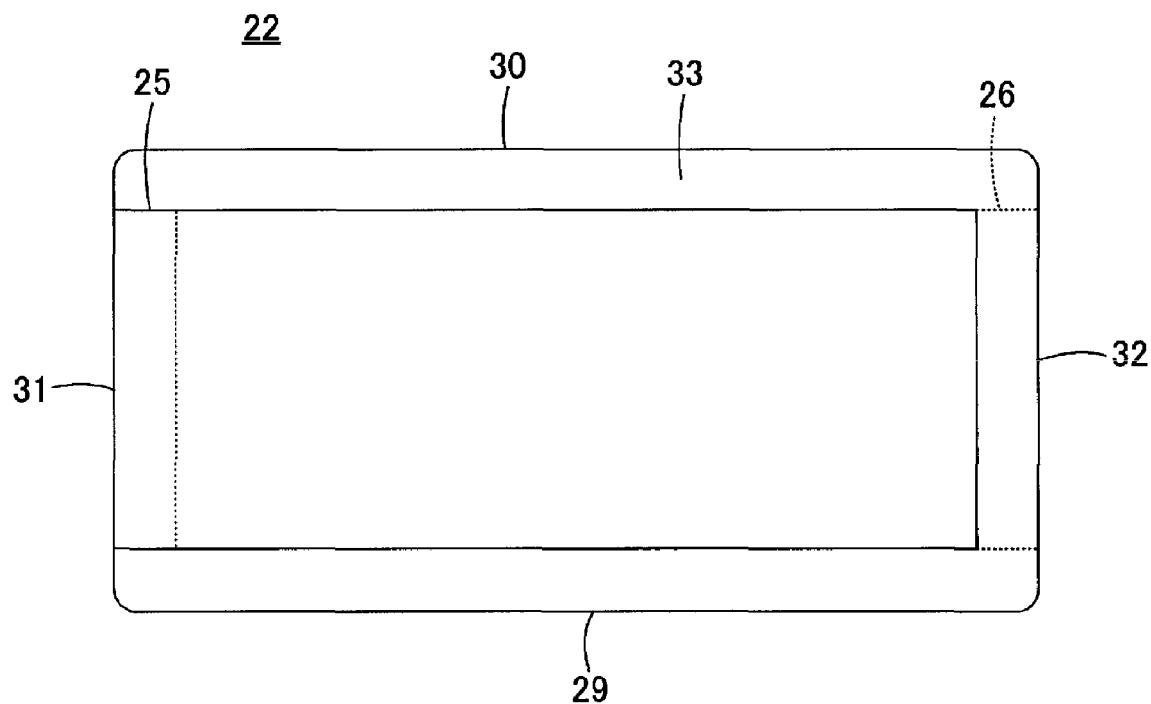
FIG. 4 is a plan view illustrating an internal structure of a ceramic element body, which is included in the multilayer ceramic capacitor as illustrated in FIG. 1.

FIGS. 1 to 4 illustrate a first preferred embodiment of the present invention. FIG. 1 is a bottom view of a multilayer ceramic capacitor 21 as one example of a ceramic electronic component according to the first preferred embodiment of the present invention. FIG. 2 is a side view of the multilayer ceramic capacitor 21, and FIG. 3 is a sectional view taken along a line III-III in FIG. 1. The multilayer ceramic capacitor 21 includes a ceramic element body 22. FIG. 4 is a plan view illustrating an internal structure of the ceramic element body 22.

The multilayer ceramic capacitor 21 includes, in addition to the ceramic element body 22, first and second external terminal electrodes 23 and 24 and first and second internal terminal electrodes 25 and 26.

The ceramic element body 22 has a first principal surface 27 and a second principal surface 28 arranged to face each other, a first lateral surface 29 and a second lateral surface 30 arranged to face each other, and a first end surface 31 and a second end surface 32 arranged to face each other. Further, the ceramic element body 22 has a multilayered structure including a plurality of ceramic layers 33 which are stacked one above another.

In the multilayer ceramic capacitor 21, assuming that a dimension measured in a direction interconnecting the first end surface 31 and the second end surface 32 of the ceramic element body 22 is L (see FIG. 1), a dimension measured in a direction interconnecting the first lateral surface 29 and the second lateral surface 30 thereof is W (see FIG. 1), and a dimension measured in a direction interconnecting the first principal surface 27 and the second principal surface 28 thereof is T (see FIG. 2), the relationship of L>W>T is held. More specifically, the advantages of preferred embodiments of the present invention are achieved in the multilayer ceramic capacitor which includes a small ceramic element body 22 satisfying T≦about 0.3 mm or a thin ceramic element body 22 satisfying about (1/5)W≦T≦about (2/3)W.

As illustrated in FIGS. 1 to 4, the ceramic element body 22 is preferably rounded at corners and ridges thereof.

A ceramic material used in forming the ceramic layers 33 can be selected from dielectric ceramics containing, as a main component, $BaTiO_3$, $CaTiO_3$, $SrTiO_3$, $CaZrO_3$, or other suitable materials. The ceramic material may further contain, as an accessory component, a Mn compound, a Fe compound, a Cr compound, a Co compound, a Ni compound, or other suitable compounds.

The ceramic element body 22 is obtained through a firing step, and the thickness of each ceramic layer after the firing is preferably in the range of about 0.5 μm to about 10 μm, for example.

In the first preferred embodiment, because the multilayer ceramic capacitor 21 is described as one example of the ceramic electronic component, a dielectric ceramic is preferably used as the ceramic material forming the ceramic layer 33. However, another example of the ceramic electronic component functioning as a piezoelectric component can be obtained by using a piezoelectric ceramic, e.g., a PZT-based ceramic, and still another example of the ceramic electronic component functioning as a thermistor can be obtained by using a semiconductor ceramic, e.g., a spinel-based ceramic.

While in the first preferred embodiment the ceramic element body 22 has the multilayered structure including a plurality of ceramic layers 33, the ceramic element body is not required to have the multilayered structure when the ceramic electronic component is not constituted as the multilayered type.

The first and second external terminal electrodes 23 and 24 will be described below.

The first external terminal electrode 23 is arranged to extend over the first principal surface 27, the first end surface 31, and the second principal surface 28. On the first end surface 31, the first external terminal electrode 23 is electrically connected to the first internal electrode 25. On the other hand, the second external terminal electrode 24 is arranged to extend over the first principal surface 27, the second end surface 32, and the second principal surface 28. On the second end surface 32, the second external terminal electrode 24 is electrically connected to the second internal electrode 26.

In the first preferred embodiment, it is preferable that, as seen from FIGS. 1 and 2, the first and second external terminal electrodes 23 and 24 are substantially not disposed on the first and second lateral surfaces 29 and 30. Therefore, the dimension of the multilayer ceramic capacitor 21 can be reduced in the direction denoted by W in FIG. 1.

When the corner between each of the end surfaces 31 and 32 and corresponding one of the lateral surfaces 29 and 30 of the ceramic element body 22 is rounded, the first and second external terminal electrodes 23 and 24 may be arranged such that they extend up to those corners. FIG. 2 illustrates a state where the first and second external terminal electrodes 23 and 24 are arranged on the corners in the above-mentioned case. Also, when the first and second external terminal electrodes 23 and 24 are made of a conductive paste, the conductive paste applied to the end surfaces 31 and 32 may spread in the longitudinal direction of the ceramic element body 22 through a distance of about 50 μm or less, for example. In some cases, the conductive paste may spread up to flat portions of the lateral surfaces 29 and 30.

Looking at the second principal surface 28 arranged to direct the mounting surface side, the first and second external terminal electrodes 23 and 24 are arranged in an opposed relation with a predetermined gap region 34 between them. Further, on the second principal surface 28, the first and second external terminal electrodes 23 and 24 have substantially rectangular regions 35 and 36, respectively. The word "substantially" is used herein in consideration of not only the fact that each of respective ends of the regions 35 and 36 have a concave-convex shape as described below, but also a possibility that corners of the regions 35 and 36 may be rounded corresponding to the rounded corners of the ceramic element body 22.

In this first preferred embodiment, the substantially rectangular regions 35 and 36 are arranged so as to reach respective ridges at which the second principal surface 28 intersects the first and second lateral surfaces 29 and 30. Further, a proportion of each of the substantially rectangular regions 35 and 36 with respect to the second principal surface 28 is preferably about 80% or more in the direction W and about 20% or more in the direction L, for example.

Respective ends 37 and 38 of the first and second external terminal electrodes 23 and 24 each preferably have a concave-convex shape. In this first preferred embodiment, the concave-convex shape is preferably an irregular rugged shape as explicitly illustrated in FIG. 1.

Figure 5:
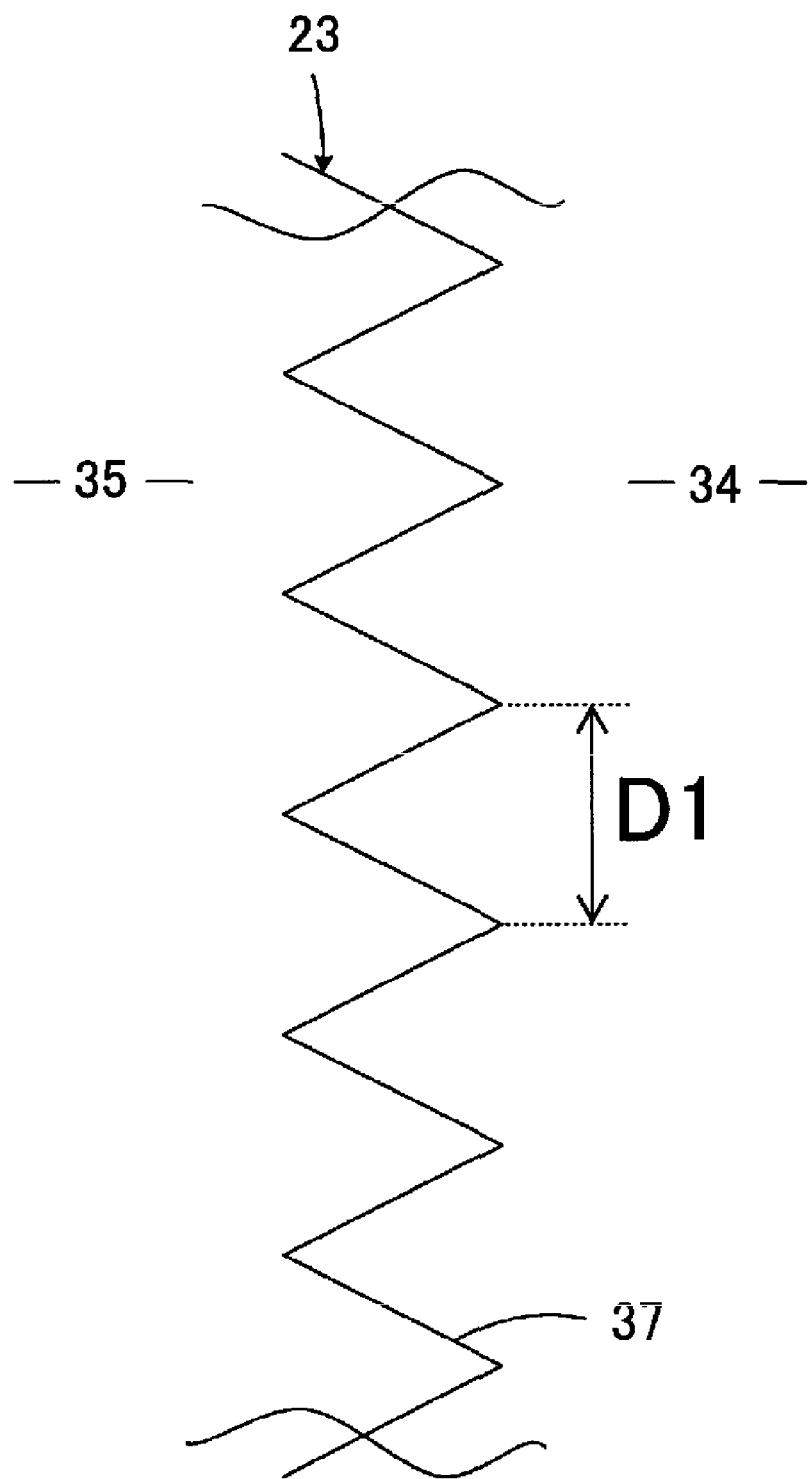
FIG. 5 is an explanatory view to explain a second preferred embodiment of the present invention, the view illustrating, in an enlarged scale, an end of a substantially rectangular region of an external terminal electrode.
Figure 6:
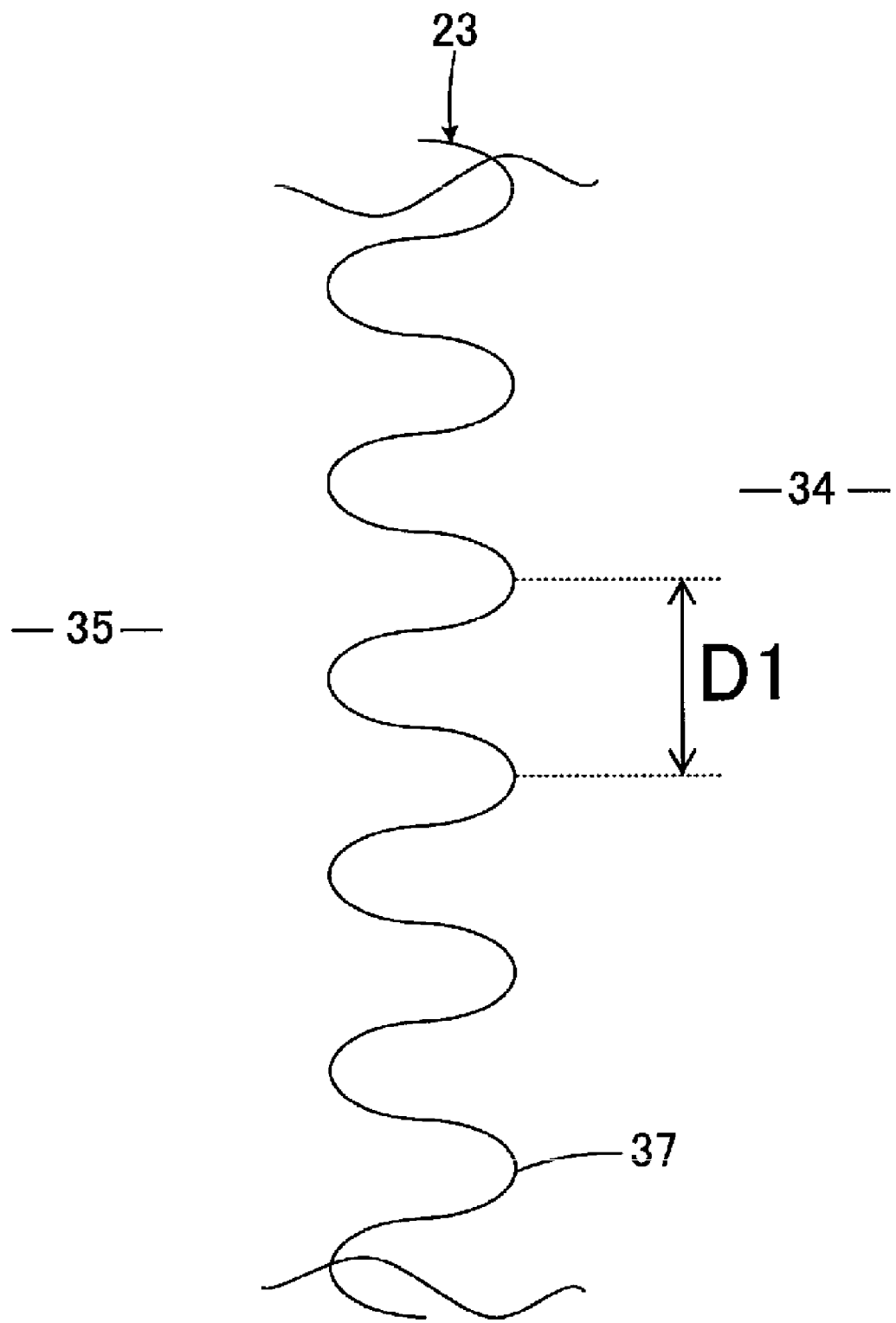
FIG. 6 is an explanatory view to explain a third preferred embodiment of the present invention, the view illustrating, in an enlarged scale, the end of the substantially rectangular region of the external terminal electrode.

FIGS. 5 and 6 are prepared to explain second and third preferred embodiments of the present invention, respectively, and illustrate, in enlarged scale, the end 37 of the first external terminal electrode 23. The concave-convex shape of the end 37 may be substantially triangular as illustrated in FIG. 5, or may be substantially sinusoidal as illustrated in FIG. 6.

From the viewpoint of distributing stress, in the case of the end 37 being substantially triangular as illustrated in FIG. 5, the shape of each convex portion is preferably regularly triangular. The sinusoidal shape illustrated in FIG. 6 is also preferable from the viewpoint of distribution stress. Further, when a plating film is formed on the first external terminal electrode 23, a distal end of each convex portion of the concave-convex shape is preferably not so sharp from the viewpoint of preventing excessive plating growth. Additionally, at the concave-convex end 37 of the first external terminal electrode 23, the number of convex portions is preferably in the range of about 10 to 50, for example.

As illustrated in FIGS. 5 and 6, an array pitch D1 of plural convex portions at the concave-convex end 37 of the first external terminal electrode 23 preferably satisfies the relationship of about $(1/50)W \leq D1 \leq$ about $(1/10)W$ with respect to the dimension W of the ceramic element body 22. When W is about 0.5 mm, for example, D1 preferably satisfies the relationship of about $10\ \mu m \leq D1 \leq$ about $50\ \mu m$, for example. For the concave-convex ends 37 and 38 illustrated in FIG. 1, although the array pitch D1 is not denoted in FIG. 1, it is preferable an array pitch of their convex portions satisfies a similar relationship with respect to the dimension W of the ceramic element body 22.

If the apexes of the convex portions are irregularly positioned when determining the array pitch D1, the array pitch D1 is preferably determined by selecting arbitrary five points in the direction W (e.g., five points spaced at substantially equal intervals between the lateral surface 29 and the lateral surface 30), measuring the distance between two adjacent apexes of the convex portions for each of the five points, and calculating an average value of the measured distances. At that time, the distance between two adjacent apexes is not always to be a linear distance between the apexes, and it is provided as the distance between two adjacent apexes in the direction W.

Also, when a level (height) difference between the adjacent concave and convex portions at the concave-convex end 37, i.e., a concave-convex difference D2, is defined as the distance illustrated in FIG. 5, $30\ \mu m \leq D2 \leq 60\ \mu m$ is preferably satisfied. If the apexes of the convex portions and the apexes of the concave portions are irregularly positioned when determining the concave-convex difference D2, the concave-convex difference D2 is determined by finding one of the apexes of the convex portions, which is most projected toward the second end surface 32 (see FIG. 1), and one of the apexes of the concave portions, which is most recessed toward the first end surface 31 (see FIG. 1), and by defining, as the concave-convex difference D2, the distance between those two apexes in the direction L (see FIG. 1).

Figure 7:
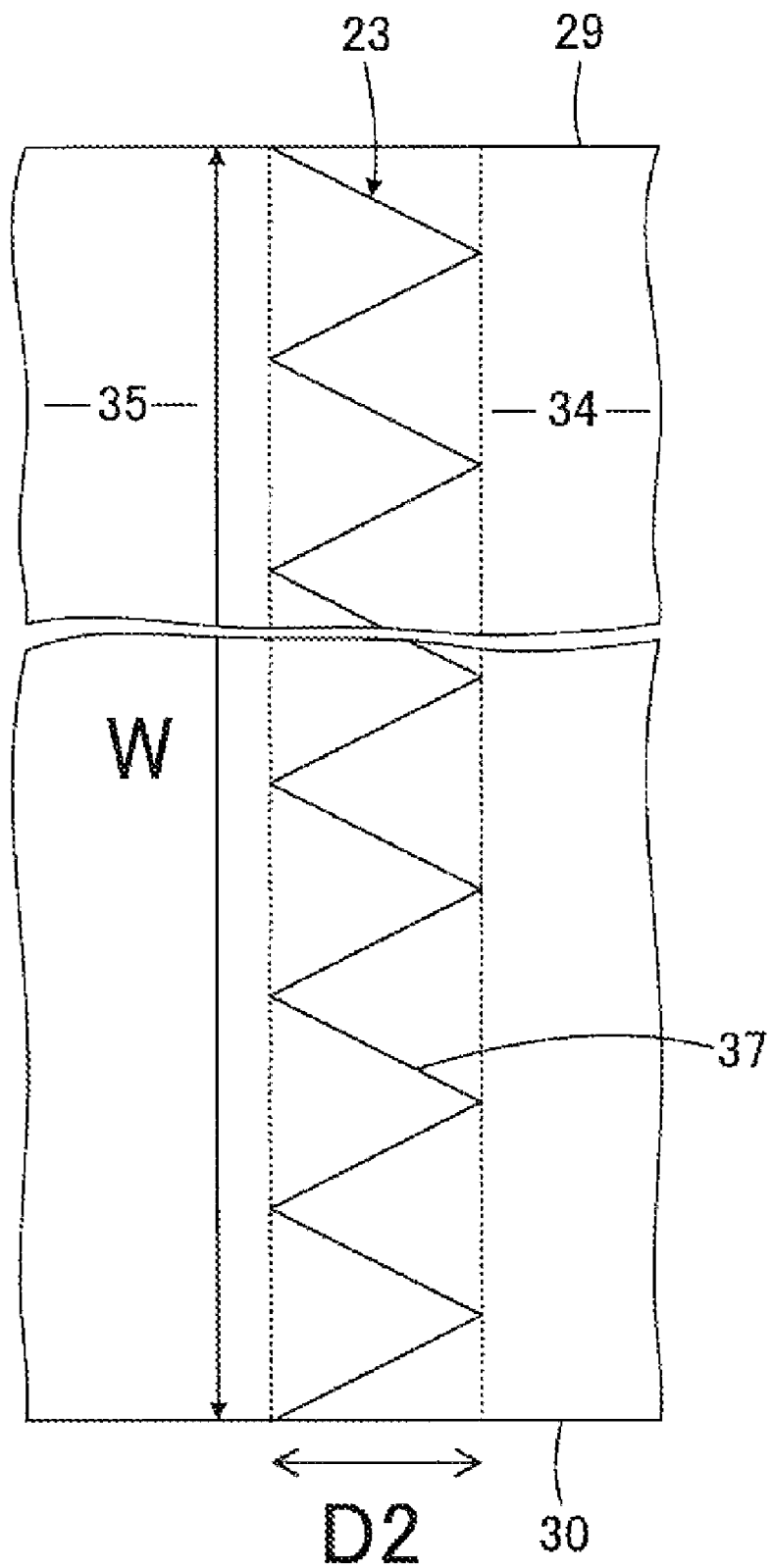
FIG. 7 is an explanatory view to explain a preferable proportion of an area occupied by the concave-convex end of the external terminal electrode in connection with the second preferred embodiment illustrated in FIG. 5.

FIG. 7 is an explanatory view to explain a preferable proportion of an area occupied by the concave-convex end 37 of the external terminal electrode 23 in connection with the second preferred embodiment illustrated in FIG. 5.

Referring to FIG. 7, a proportion of the area occupied by the concave-convex end 37 of the external terminal electrode 23 is preferably about 40% to about 60%, for example, of a rectangular region defined such that its long side has the same length as the side of the ceramic element body 22 extending in the direction W and its short side has the same length as that specified by the concave-convex difference D2.

When the external terminal electrode 23 is not extended up to the lateral surface 29 and/or the lateral surface 30, the above-mentioned rectangular region is replaced with a rectangular region defined such that its long side has the same length as that specified by the distance in the direction W between the apexes of the convex and/or concave portions closest to the lateral surfaces 29 and 30 and its short side has the same length as that specified by the concave-convex difference D2.

While the above description with reference to FIGS. 5 and 6 and the above description with reference to FIG. 7 have been made only in connection with the first external terminal electrode 23, the second external terminal electrode 24 also has a similar structure.

Further, in this first preferred embodiment, the above-described structural feature on the second principal surface 28 is preferably used on the first principal surface 27 as well.

Examples of conductive materials usable in forming the external terminal electrodes 23 and 24 include Cu, Ni, Ag, Pd, an Ag—Pd alloy, and Au. The external terminal electrodes 23 and 24 are formed, for example, by firing a conductive paste. In this respect, the external terminal electrodes 23 and 24 may be formed by the so-called "co-firing" in which they are fired at the same time as the internal electrodes 25 and 26, or by the so-called "post-firing" in which they are formed by coating and firing the conductive paste after the internal electrodes 25 and 26 have been fired. The thickness of each of the external terminal electrodes 23 and 24 is preferably in the range of about 10 μm to about 50 μm, for example, in its thickest portion.

A plating film may be formed on each of the external terminal electrodes 23 and 24. Examples of metals usable in forming the plating film include Cu, Ni, Ag, Pd, an Ag—Pd alloy, and Au. The plating film may be in the form of a single layer or multiple layers. In any case, the thickness per layer of the plating film is preferably in the range of about 1 µm to about 10 µm, for example. Additionally, a resin layer for stress relaxation may be formed between each of the external terminal electrodes 23 and 24 and the plating film.

The first and second internal electrodes 25 and 26 will be described below.

As illustrated in FIGS. 3 and 4, the first internal electrode 25 is led out to the first end surface 31, and the second internal electrode 26 is led out to the second end surface 32. Thus, as described above, the first internal electrode 25 is electrically connected to the first external terminal electrode 23 on the first end surface 31, and the second internal electrode 26 is electrically connected to the second external terminal electrode 24 on the second end surface 32.

The first internal electrode 25 and the second internal electrode 26 are arranged to face each other with particular ones of the plural ceramic layers 33 interposed between both the electrodes. A predetermined electrical characteristic is developed in a portion sandwiched by the first internal electrode 25 and the second internal electrode 26 arranged to face each other. In the case of the multilayer ceramic capacitor 21 as in this first preferred embodiment, electrostatic capacitance is generated in the portion sandwiched by the first internal electrode 25 and the second internal electrode 26 arranged to face each other.

Examples of conductive materials usable in forming the internal electrodes 25 and 26 include Ni, Cu, Ag, Pd, an Ag—Pd alloy, and Au, for example.

The thickness of each of the internal electrodes 25 and 26 after the firing is preferably in the range of about 0.3 µm to about 2.0 µm, for example.

When a preferred embodiment of the present invention is applied to other ceramic electronic components than the multilayer ceramic capacitor, the internal electrodes are not provided in some cases.

A method of manufacturing the multilayer ceramic capacitor 21 will be described below with reference to FIGS. 8 and 9 as well.

First, a ceramic green sheet for the ceramic layer 33, a conductive paste for the internal electrodes, and a conductive paste for the external terminal electrodes are prepared. When the ceramic green sheet and the conductive pastes are prepared, a binder and a solvent are also prepared additionally. The binder and the solvent used herein can be optionally selected from among known organic binders and organic solvents.

Figure 8A:
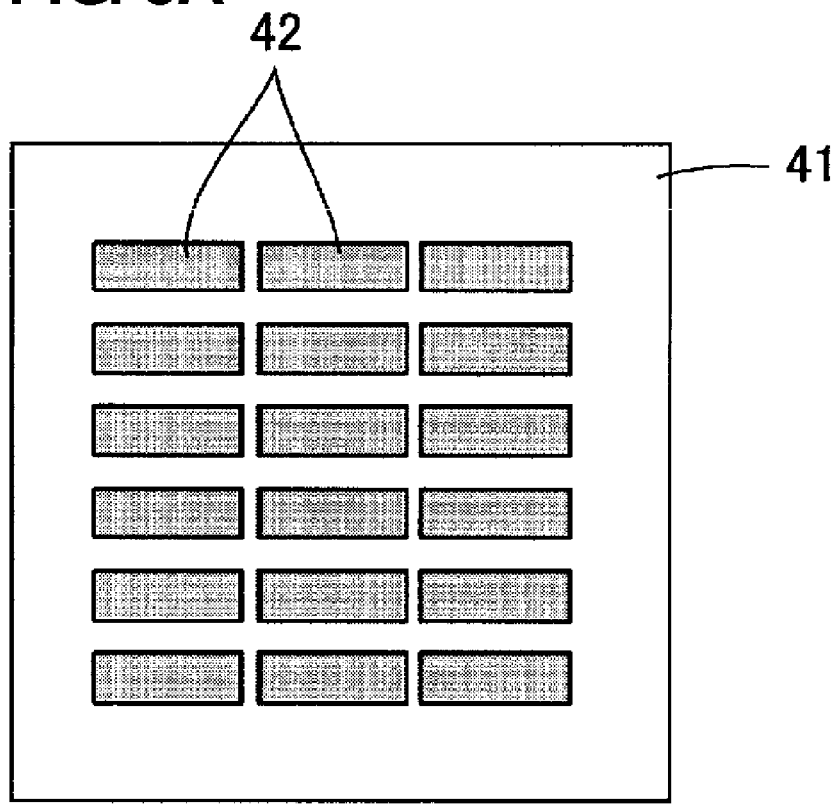
FIGS. 8A and 8B are plan views to explain a method of manufacturing the multilayer ceramic capacitor illustrated in FIG. 1, the views illustrating ceramic green sheets in a state where internal electrode patterns are formed.
Figure 8B:
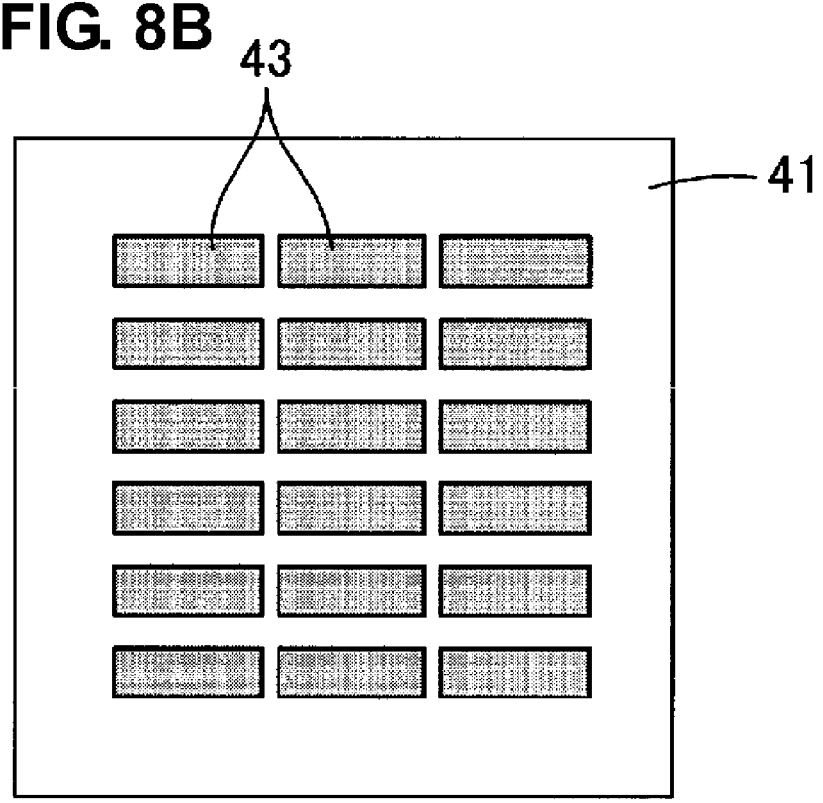

Next, as illustrated in FIGS. 8A and 8B, the conductive pastes are printed in respective predetermined patterns on ceramic sheets 41 by screen printing, for example, such that first and second internal electrode patterns 42 and 43 serving respectively as the first and second internal electrodes 25 and 26 are formed on the ceramic sheets 41.

Next, a predetermined number of ceramic green sheets for forming an external layer on one side, each of which sheets does not include the first and second internal electrode patterns 42 and 43, are stacked one above another. On those stacked ceramic green sheets, a predetermined number of ceramic green sheets 41 each having the first internal electrode pattern 42 printed thereon and a predetermined number of ceramic green sheets 41 each having the second internal electrode pattern 43 printed thereon are alternately stacked one above another. On the stacked ceramic green sheets 41 and 43, a predetermined number of ceramic green sheets for forming an external layer on the other side are stacked one above another, thus fabricating a mother laminate 44. At that time, the mother laminate 44 may be pressed in the stacking direction by a suitable device, such as a hydrostatic press.

Figure 9:
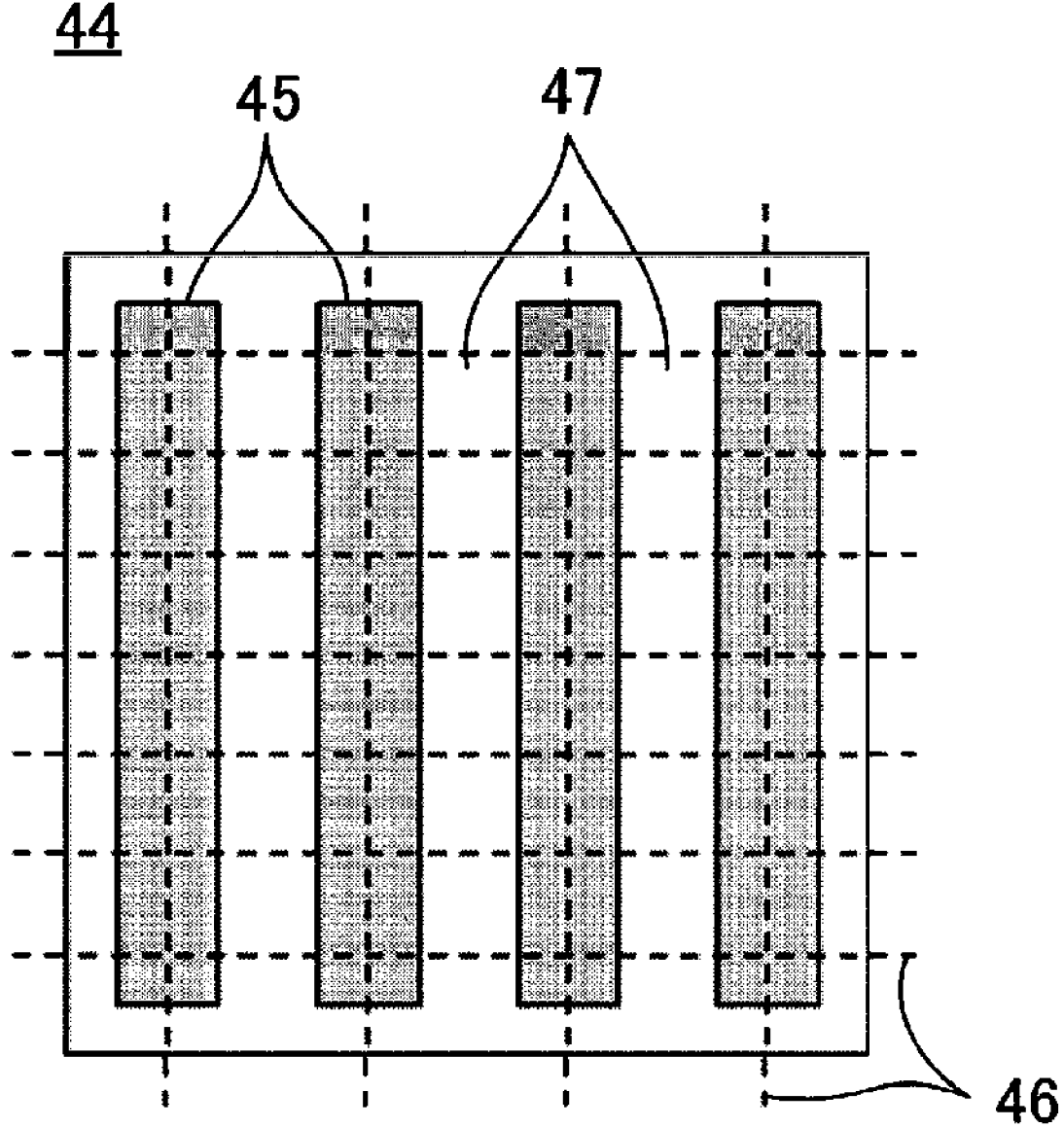
FIG. 9 is a plan view to explain a method of manufacturing the multilayer ceramic capacitor illustrated in FIG. 1, the view illustrating a mother laminate in a state where external terminal electrode patterns are formed.

Next, as illustrated in FIG. 9, external terminal electrode patterns 45, which will become the first and second external terminal electrodes 23 and 24, are disposed on each of upper and lower surfaces of the mother laminate 44 by screen printing, for example.

Next, the mother laminate 44 is cut into predetermined sizes along cut lines 46 denoted by broken lines in FIG. 9. Thus, green ceramic element bodies 47, which will become individual ceramic bodies 22, are obtained by cutting the mother laminate 44.

Next, the green ceramic element bodies 47 are subjected to the barrel polishing. At that time, a polishing rate is adjusted such that the ends 37 and 38 of the external terminal electrodes 23 and 24 each are preferably to have a concave-convex shape.

Next, the conductive paste is coated on both end surfaces of the green ceramic element body 47 to form portions of the external terminal electrodes 23 and 24, which extend over the end surfaces 31 and 32.

Next, the green ceramic element bodies 47 are each fired. Though depending on the ceramic materials and the conductive materials which are used in practice, the firing temperature is preferably in the range of about 900° C. to about 1300° C. As a result, the ceramic green sheet, the conductive paste for the internal electrodes, and the conductive paste for the external terminal electrodes are fired at the same time, whereby the multilayer ceramic capacitor 21 in a sintered state is obtained. Thereafter, plating is performed on the surfaces of the external terminal electrodes 23 and 24 as required.

While, in the above-described manufacturing method, the concave-convex shape is given to the ends 37 and 38 of the external terminal electrodes 23 and 24 preferably by the so-called barrel polishing, the concave-convex shape can be formed by another method of properly fabricating a printing plate, for example, when the conductive paste is printed. Stated another way, it is also possible to provide the concave-convex shape by increasing an amount of the solvent for the conductive paste to such an extent that the applied conductive paste spreads following the figure of the printing plate. In particular, the concave-convex shape of the end 37 of the external terminal electrode 23, illustrated in each of FIGS. 5 and 6, is suitably formed by fabricating the printing plate in the desired shape when the conductive paste is printed.

Other preferred embodiments of the present invention will be described below.

Figure 10:
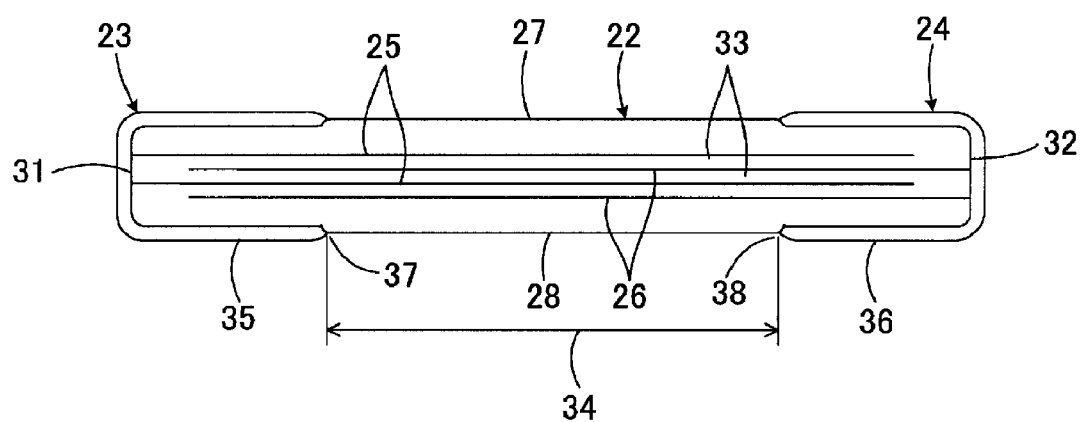
FIG. 10 is a sectional view, corresponding to FIG. 3, to explain a fourth preferred embodiment of the present invention.

FIG. 10 is a sectional view, corresponding to FIG. 3, to explain a fourth preferred embodiment of the present invention. Elements in FIG. 10 corresponding to those illustrated in FIG. 3 are denoted by similar reference characters, and duplicate description of those elements is omitted.

A multilayer ceramic capacitor 21a illustrated in FIG. 10 is featured in that the external terminal electrodes 23 and 24 are each arranged so as to be buried in the ceramic element body 22 at least partially in the direction of thickness thereof. With such a structural feature, the thickness of the multilayer ceramic capacitor 21a can be reduced.

The above-described structure can be realized, when the method of manufacturing the multilayer ceramic capacitor 21 according to the first preferred embodiment is used, by pressing the mother laminate 44 in the stacking direction after the external terminal electrode patterns 45 have been formed as illustrated in FIG. 9.

Figure 11:
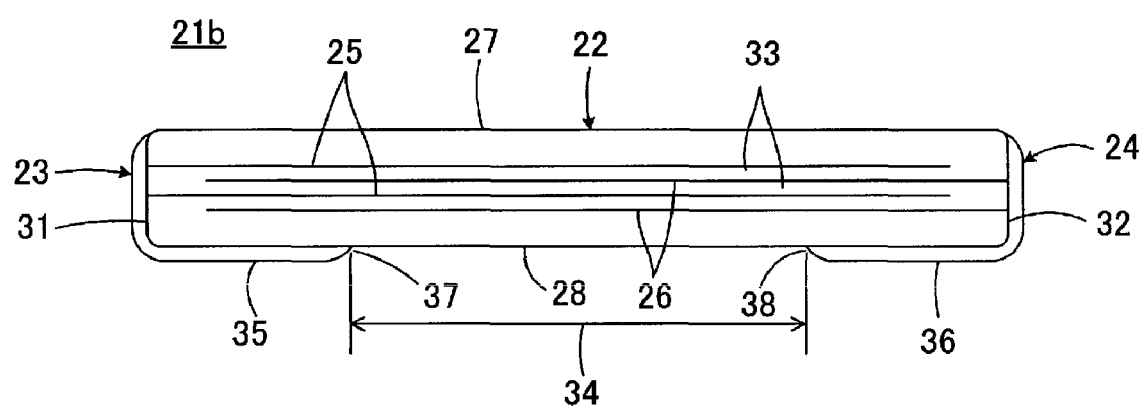
FIG. 11 is a sectional view, corresponding to FIG. 3, to explain a preferred fifth preferred embodiment of the present invention.

FIG. 11 is a sectional view, corresponding to FIG. 3, to explain a fifth preferred embodiment of the present invention. Elements in FIG. 11 corresponding to those illustrated in FIG. 3 are denoted by similar reference characters, and duplicate description of those elements is omitted.

A multilayer ceramic capacitor 21b illustrated in FIG. 11 is featured in that the external terminal electrodes 23 and 24 are not formed on the first principal surface 27. With such a structural feature, the thickness of the multilayer ceramic capacitor 21b can be reduced.

Figure 12:
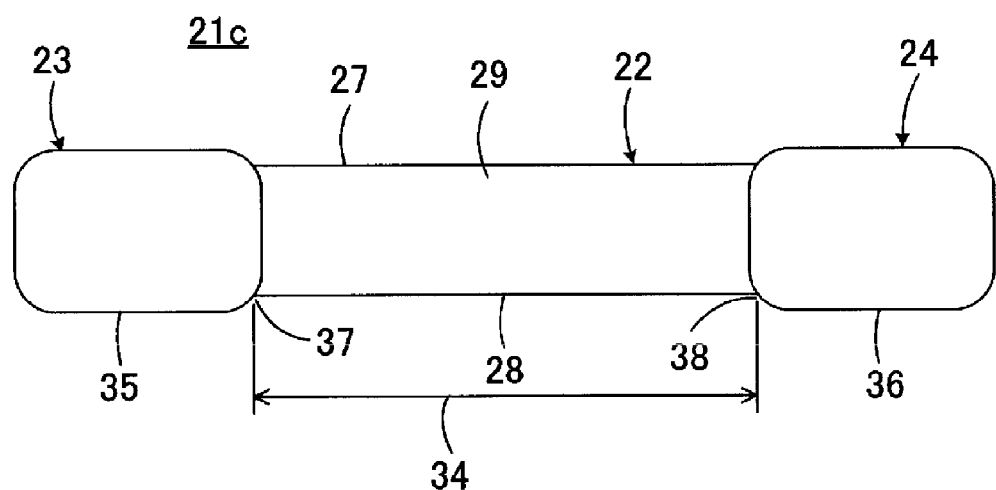
FIG. 12 is a side view, corresponding to FIG. 2, to explain a sixth preferred embodiment of the present invention.

FIG. 12 is a sectional view, corresponding to FIG. 2, to explain a sixth preferred embodiment of the present invention. Elements in FIG. 12 corresponding to those illustrated in FIG. 2 are denoted by similar reference characters, and duplicate description of those elements is omitted.

A multilayer ceramic capacitor 21c illustrated in FIG. 12 is featured in that the external terminal electrodes 23 and 24 are each provided on the first and second lateral surfaces 29 and 30 as well. This sixth preferred embodiment can be suitably used when it is desired to enlarge a wetting area of a solder and to increase reliability in connection with respect to the wiring board.

Figure 13:
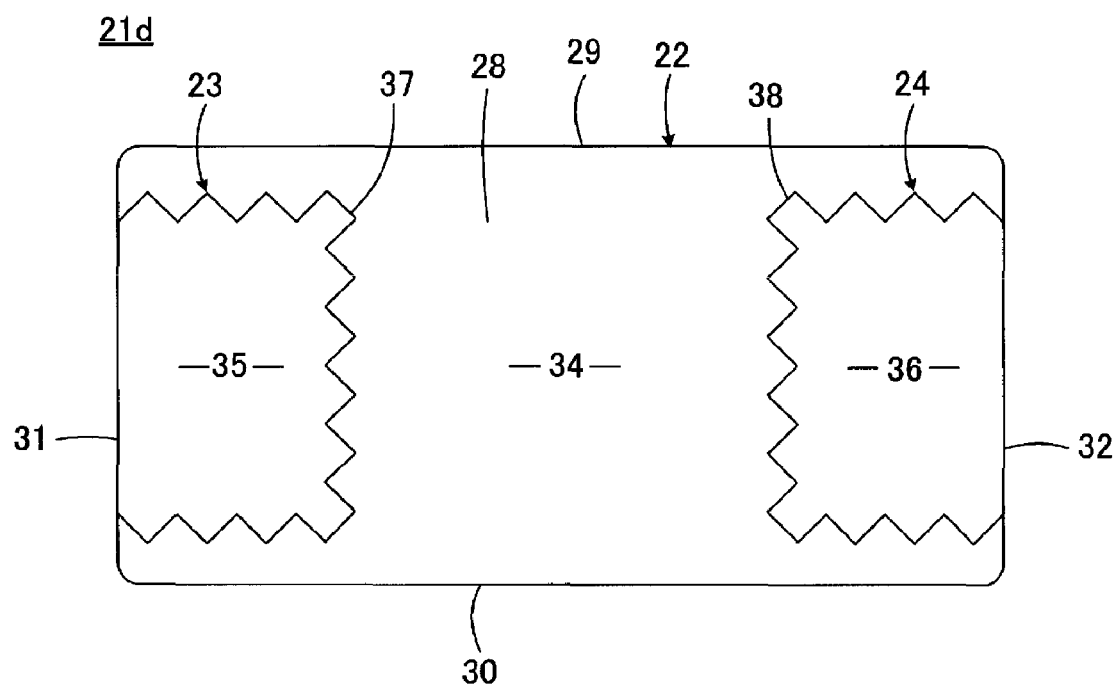
FIG. 13 is a bottom view, corresponding to FIG. 1, to explain a seventh preferred embodiment of the present invention.

FIG. 13 is a bottom view, corresponding to FIG. 1, to explain a seventh preferred embodiment of the present invention. Elements in FIG. 13 corresponding to those illustrated in FIG. 1 are denoted by similar reference characters, and duplicate description of those elements is omitted.

A multilayer ceramic capacitor 21d illustrated in FIG. 13 is featured in that the substantially rectangular regions 35 and 36 of the external terminal electrodes 23 and 24 are arranged not to extend up to the ridges where the second principal surface 28 intersects the first and second lateral surfaces 29 and 30, and that each of the substantially rectangular regions 35 and 36 has the concave-convex shape in portions of their ends 37 and 38 as well, which are arranged to face the lateral surfaces 29 and 30. With such a structural feature, the effect of distributing stress can be increased.

While FIG. 13 illustrates only the side including the second principal surface 28, the substantially rectangular regions 35 and 36 of the external terminal electrodes 23 and 24 are further preferably provided, though not illustrated, in a similar structure on the side including the first principal surface 27.

Figure 14:
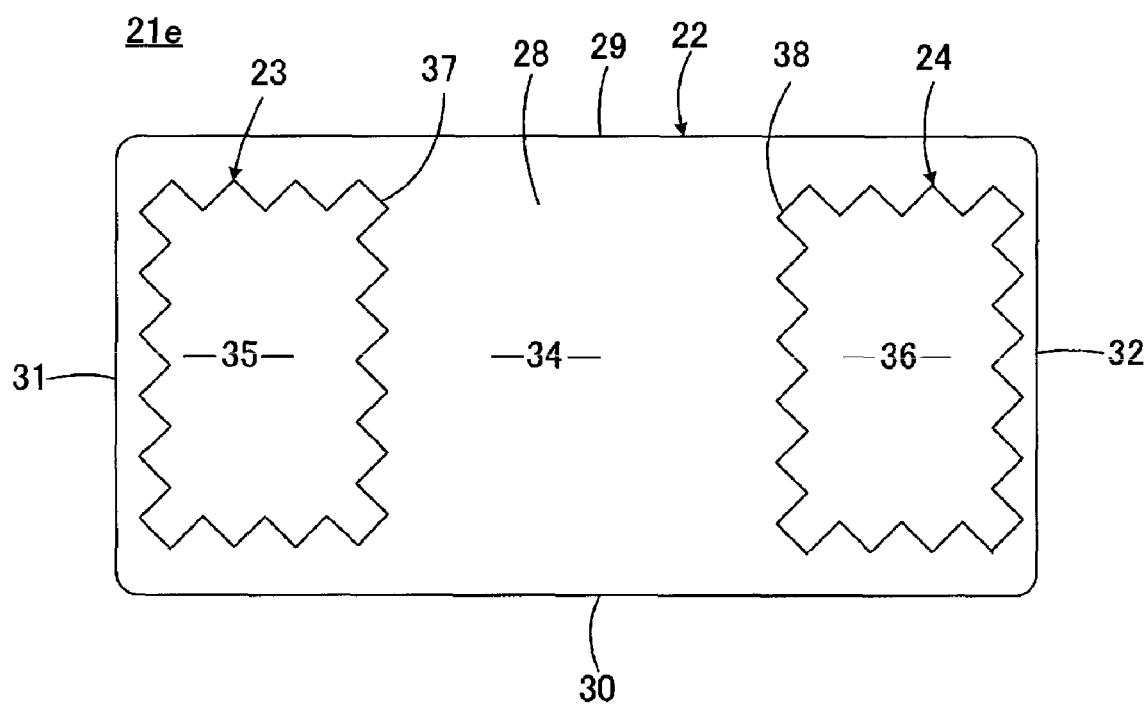
FIG. 14 is a bottom view, corresponding to FIG. 1, to explain an eighth preferred embodiment of the present invention.
Figure 15:
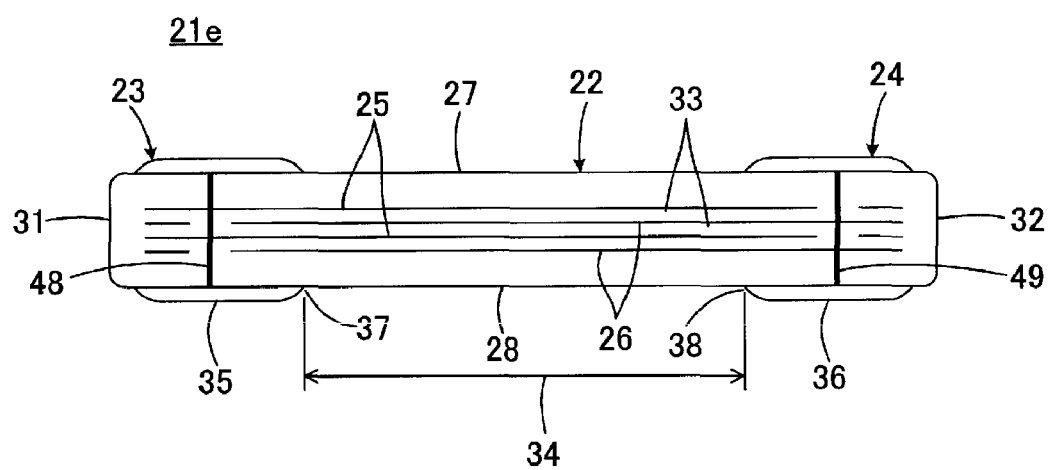
FIG. 15 is a sectional view, corresponding to FIG. 3, to explain the eighth preferred embodiment of the present invention.
Figure 16:
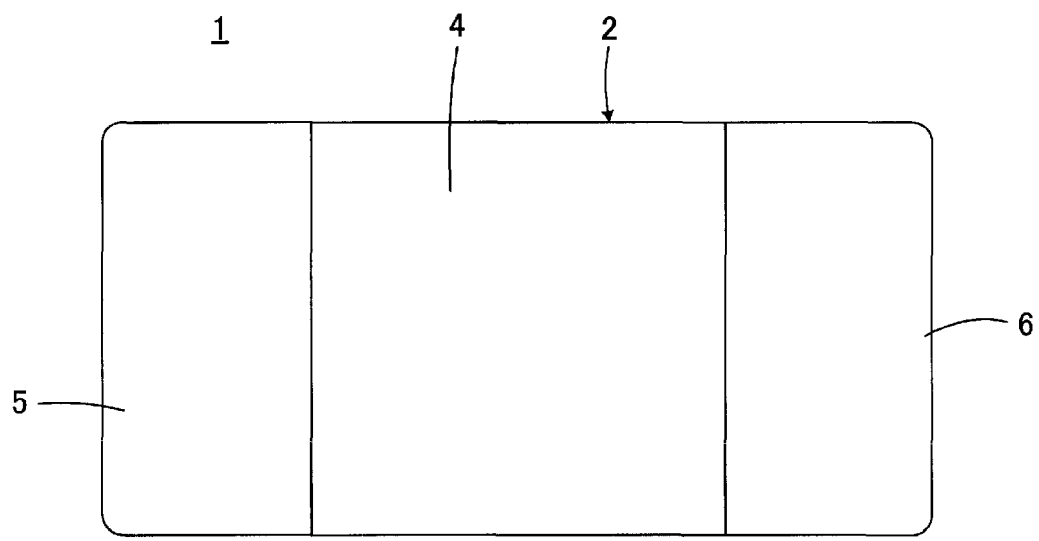
FIG. 16 is a plan view of a multilayer ceramic capacitor as one example of known multilayer ceramic electronic components.
Figure 17:
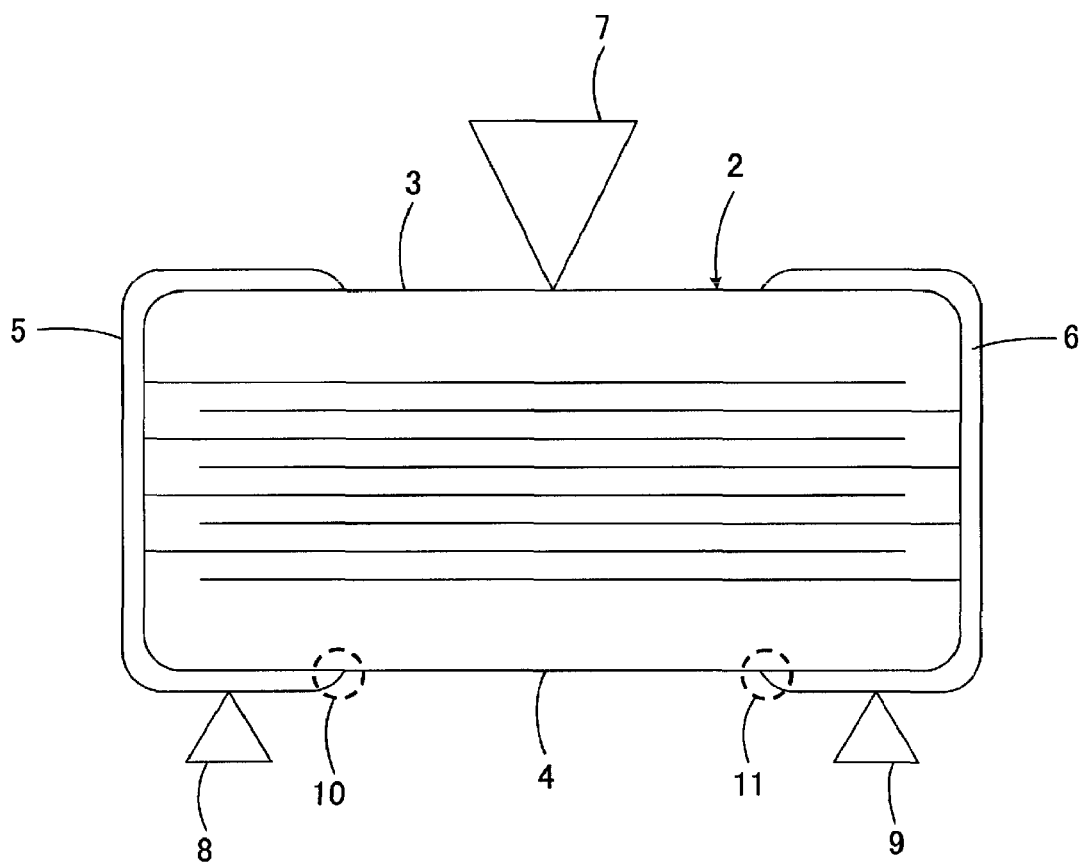
FIG. 17 is a sectional view of the multilayer ceramic capacitor illustrated in FIG. 16, the view being adapted to explain the problems which are caused due to stress applied when the multilayer ceramic capacitor is mounted or in a mounted state.
Figure 18:
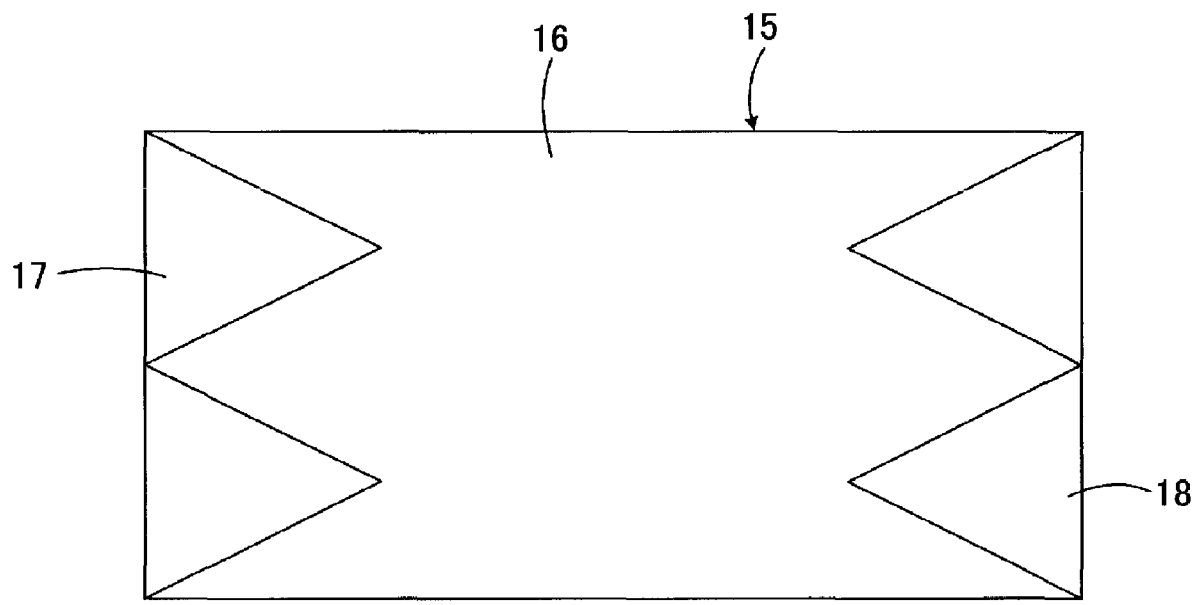
FIG. 18 is a bottom view of a known multilayer ceramic electronic component, the view looking at the side including a principal surface.

FIGS. 14 and 15 are a bottom view and a sectional view, corresponding respectively to FIG. 1 and FIG. 3, to explain an eighth preferred embodiment of the present invention. Elements in FIGS. 14 and 15 corresponding to those illustrated in FIGS. 1 and 3 are denoted by similar reference characters, and duplicate description of those elements is omitted.

A multilayer ceramic capacitor 21e illustrated in FIGS. 14 and 15 is featured in that the substantially rectangular regions 35 and 36 of the external terminal electrodes 23 and 24 are arranged not to extend up to not only the ridges where the second principal surface 28 intersects the first and second lateral surfaces 29 and 30, but also the ridges where the second principal surface 28 intersects the first and second end surfaces 31 and 32. Further, the substantially rectangular regions 35 and 36 have the concave-convex shape at their ends 37 and 38 over the entire peripheries thereof.

In addition, the ceramic element body 22 includes first and second via-hole conductors 48 and 49 disposed therein such that the first via-hole conductor 48 extends up to each of the first and second principal surfaces 27 and 28 for electrical connection between the first internal electrode 25 and the first external terminal electrode 23, and that the second via-hole conductor 49 extends up to each of the first and second principal surfaces 27 and 28 for electrical connection between the second internal electrode 26 and the second external terminal electrode 24.

As a modification of the eighth preferred embodiment, the first and second external terminal electrodes 23 and 24 may be not provided on the first principal surface 27, and the via-hole conductors 48 and 49 may be arranged so as to reach only the second principal surface 28.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   a ceramic element body including a first principal surface and a second principal surface arranged to face each other, a first lateral surface and a second lateral surface arranged to face each other, and a first end surface and a second end surface arranged to face each other, the second principal surface being directed to the mounting surface side;
   a first external terminal electrode disposed at least on the second principal surface of the ceramic element body; and
   a second external terminal electrode disposed at least on the second principal surface of the ceramic element body in a spaced relation to the first external terminal electrode with a predetermined gap region disposed therebetween; wherein each of the first external terminal electrode and the second external terminal electrode has a substantially rectangular region on the second principal surface;
   the first external terminal electrode is arranged to extend onto the first end surface;
   the second external terminal electrode is arranged to extend onto the second end surface;
   an end of the first external terminal electrode, which is arranged in contact with the gap region, and an end of the second external terminal electrode, which is arranged in contact with the gap region, each has a concave-convex shape on the second principal surface; and
   each of the ends of the first and second external terminal electrodes having the concave-convex shape includes a plurality of convex portions.

2. The ceramic electronic component according to claim 1, wherein the first external terminal electrode further has a substantially rectangular region on the first principal surface, the second external terminal electrode further has a substantially rectangular region on the first principal surface in a spaced relation to the first external terminal electrode with a predetermined gap region disposed therebetween, and an end of the first external terminal electrode, which is arranged in contact with the gap region, and an end of the second external terminal electrode, which is arranged in contact with the gap region, each have a concave-convex shape on the first principal surface.

3. The ceramic electronic component according to claim 1, further comprising first and second internal electrodes disposed inside the ceramic element body, wherein the first internal electrode is electrically connected to the first external terminal electrode, and the second internal electrode is electrically connected to the second external terminal electrode.

4. The ceramic electronic component according to claim 3, wherein the ceramic element body has a multilayered structure including a plurality of ceramic layers stacked one above another, and the first internal electrode and the second internal electrode are arranged to face each other with particular ones of the ceramic layers interposed therebetween.

5. The ceramic electronic component according to claim 1 further comprising first and second internal electrodes disposed inside the ceramic element body, wherein the first internal electrode is electrically connected to the first external terminal electrode on the first end surface, and the second internal electrode is electrically connected to the second external terminal electrode on the second end surface.

6. The ceramic electronic component according to claim 1, further comprising first and second internal electrodes and first and second via-hole conductors disposed in the ceramic element body, wherein the first via-hole conductor extends up to at least the second principal surface for electrical connection between the first internal electrode and the first external terminal electrode, and the second via-hole conductor extends up to at least the second principal surface for electrical connection between the second internal electrode and the second external terminal electrode.

7. The ceramic electronic component according to claim 6, wherein the first external terminal electrode and the second external terminal electrode are arranged not to extend over any of the first lateral surface, the second lateral surface, the first end surface, and the second end surface.

8. The ceramic electronic component according to claim 1, wherein the ceramic element body satisfies a relationship of $W>T$, assuming that a dimension of the ceramic element body measured in a direction interconnecting the first lateral surface and the second lateral surface is W and a dimension of the ceramic element body measured in a direction interconnecting the first principal surface and the second principal surface is T.

9. The ceramic electronic component according to claim 1, wherein the concave-convex shape is an irregular rugged shape.

10. The ceramic electronic component according to claim 1, wherein the concave-convex shape is a substantially triangular shape.

11. The ceramic electronic component according to claim 1, wherein the concave-convex shape is a substantially sinusoidal shape.

12. The ceramic electronic component according to claim 1, wherein a relationship of about $(1/50)W \leq D1 \leq$ about $(1/10)W$ is satisfied, assuming that an array pitch of plural convex portions in the concave-convex shape is D1, and a dimension of the ceramic element body measured in a direction interconnecting the first lateral surface and the second lateral surface is W.

13. The ceramic electronic component according to claim 1, wherein the first and second external terminal electrodes are each arranged to be buried in the ceramic element body at least partially in a direction of thickness thereof.

14. The ceramic electronic component according to claim 1, wherein the ceramic element body satisfies relationships of $L>W>T$, $T \leq$ about 0.3 mm, and about $(1/5)W \leq t \leq$ about $(2/3)W$, where a dimension of the ceramic element body measured in a direction interconnecting the first end surface and the second end surface is L, a dimension of the ceramic element body measured in a direction interconnecting the first lateral surface and the second lateral surface is W and a dimension of the ceramic element body measured in a direction interconnecting the first principal surface and the second principal surface is T.

15. The ceramic electronic component according to claim 1, wherein each of the first and second external terminal electrodes extends onto flat portions of the first and second lateral surfaces.

16. The ceramic electronic component according to claim 1, wherein each of the first and second external terminal electrodes has a thickness of about 10 μm to about 50 μm at a thickest portion thereof.

17. The ceramic electronic component according to claim 1, wherein each of the first and second external terminal electrodes is formed by simultaneously firing a conductive paste and a green ceramic element body.

18. The ceramic electronic component according to claim 1, wherein each of the first and second external terminal electrodes includes at least one of Cu, Ni, Ag, Pd, an Ag—Pd alloy, and Au.

19. The ceramic electronic component according to claim 1, wherein a Cu plating film is provided on each of the first and second external terminal electrodes.

20. The ceramic electronic component according to claim 19, wherein the Cu plating film has a thickness of about 1 μm to about 10 μm.

21. The ceramic electronic component according to claim 1, wherein each of the first and second external terminal electrodes is disposed only on the second principal surface.

22. A ceramic electronic component comprising:
a ceramic element body including a first principal surface and a second principal surface arranged to face each other, a first lateral surface and a second lateral surface arranged to face each other, and a first end surface and a second end surface arranged to face each other, the second principal surface being directed to the mounting surface side;
a first external terminal electrode disposed at least on the second principal surface of the ceramic element body; and
a second external terminal electrode disposed at least on the second principal surface of the ceramic element body in a spaced relation to the first external terminal electrode with a predetermined gap region disposed therebetween; wherein
the ceramic element body satisfies relationship of $T \leq$ about $(2/3)W$, where a dimension of the ceramic element body measured in a direction interconnecting the first lateral surface and the second lateral surface is W and a dimension of the ceramic element body measured in a direction interconnecting the first principal surface and the second principal surface is T;
the first external terminal electrode is arranged to extend onto the first end surface;
the second external terminal electrode is arranged to extend onto the second end surface;
each of the first external terminal electrode and the second external terminal electrode includes a substantially rectangular region on the second principal surface; and
an end of the first external terminal electrode, which is arranged in contact with the gap region, and an end of the second external terminal electrode, which is arranged in contact with the gap region, each has a concave-convex shape on the second principal surface.

23. A ceramic electronic component comprising:
a ceramic element body including a first principal surface and a second principal surface arranged to face each other, a first lateral surface and a second lateral surface arranged to face each other, and a first end surface and a second end surface arranged to face each other, the second principal surface being directed to the mounting surface side;
only one first external terminal electrode disposed at least on the second principal surface of the ceramic element body; and
only one second external terminal electrode disposed at least on the second principal surface of the ceramic element body in a spaced relation to the first external terminal electrode with a predetermined gap region disposed therebetween; wherein
the ceramic element body satisfies relationship and T about (⅔)W, where a dimension of the ceramic element body measured in a direction interconnecting the first lateral surface and the second lateral surface is W and a dimension of the ceramic element body measured in a direction interconnecting the first principal surface and the second principal surface is T;
each of the only one first external terminal electrode and the only one second external terminal electrode includes a substantially rectangular region on the second principal surface; and
an end of the only one first external terminal electrode, which is arranged in contact with the gap region, and an end of the only one second external terminal electrode, which is arranged in contact with the gap region, each have a concave-convex shape on the second principal surface.

24. The ceramic electronic component according to claim 23, wherein the only one first external terminal electrode is disposed on the first principal surface, and the only one second external terminal electrode is disposed on the first principal surface.

* * * * *